United States Patent [19]

Kaufman et al.

[11] Patent Number: 4,948,257
[45] Date of Patent: Aug. 14, 1990

[54] LASER OPTICAL MEASURING DEVICE AND METHOD FOR STABILIZING FRINGE PATTERN SPACING

[75] Inventors: Stanley L. Kaufman, Minneapolis; Frank D. Dorman, Golden Valley; Daniel C. Bjorkquist, New Brighton; Miles R. Finn, Minneapolis, all of Minn.

[73] Assignee: TSI Incorporated, St. Paul, Minn.

[21] Appl. No.: 372,223

[22] Filed: Jun. 23, 1989

Related U.S. Application Data

[63] Continuation of Ser. No. 96,925, Sep. 14, 1987, abandoned.

[51] Int. Cl.$^5$ ................................................ G01C 9/02
[52] U.S. Cl. .................................... 356/354; 356/336; 356/343; 356/28.5
[58] Field of Search ...................... 356/28 S, 237, 336, 356/343, 354, 358, 356

[56] References Cited

U.S. PATENT DOCUMENTS

| | | | |
|---|---|---|---|
| 3,904,835 | 9/1975 | Matsumoto | 356/354 |
| 4,030,830 | 6/1977 | Holly | 356/237 |
| 4,334,779 | 6/1982 | Domey et al. | 356/358 |
| 4,540,283 | 9/1985 | Bachalo | 356/28.5 |
| 4,633,714 | 1/1987 | Mazumder et al. | 356/336 |

OTHER PUBLICATIONS

Chapter 1 and Sections 2.1 and 2.2 excerpted from Durrani and Greated, Laser Systems in Flow Measurement, Plenum Press (1977).
Article by Chang, *Acoustooptic Devices and Their Applications*, IEEE Transactions on Sonics and Ultrasonics, vol. SU-23, No. 1 (Jan. 1976).
Article by Lekavich, *Basics of Acousto-Optic Devices*, Lasers and Applications (Apr. 1986).

Primary Examiner—Vincent P. McGraw
Assistant Examiner—S. A. Turner
Attorney, Agent, or Firm—Merchant, Gould, Smith, Edell, Welter & Schmidt

[57] ABSTRACT

Methods and apparatus for enhancing the accuracy of laser optical measuring instruments using fringe pattern spacing are disclosed. The apparatus in one embodiment includes a laser beam source 10, a beam splitter 14, and mirrors 22 to deflect the beams 18, 20 emitted from the beam splitter 14 to a sensing volume. Alternative embodiments include prisms 42, 44, gratings 62 or other optical devices in lieu of mirrors 22. Objects passing through the sensing volume scatter light which is detected by the instrument to determine, among other things, the velocity of the object. The emitted beams 18, 20 are automatically deflected in response to wavelength changes of the laser beam 16 such that variations in the fringe spacing, due to variations in laser beam 16 wavelength, are compensated by variations in the closing angle K of the emitted, deflected beams. The fringe pattern spacing is thereby held more nearly constant enhancing the accuracy of the instrument. Methods of enhancing the accuracy of measurements taken with laser optical measuring instruments are also disclosed.

25 Claims, 3 Drawing Sheets

LASER OPTICAL MEASURING DEVICE AND METHOD FOR STABILIZING FRINGE PATTERN SPACING

This is a continuation of application Ser. No. 096,925, filed Sept. 14, 1987, and now abandoned.

FIELD OF THE INVENTION

The invention relates to laser optical measuring instruments having increased accuracy, and methods of enhancing the accuracy of measurements taken with laser optical measuring instruments. More specifically, the invention relates to enhancing the accuracy of measurements taken with the laser optical measuring instrument where the instrument depends on a fringe pattern spacing that can vary with laser beam wavelength and direction. The invention is particularly useful when applied to the laser Doppler velocimeter.

BACKGROUND OF THE INVENTION

Laser measuring instrumentation has been used for some time, particularly where probes would interfere with accurate measurement. Such laser devices can include velocimeters, interferometers, and particle sizing instruments. Lasers are used as the light source in these optical measuring devices.

The well-known arithmetic formulas used to calculate measurements taken by laser optical measuring devices generally take into account the laser wavelength. A constant laser wavelength is assumed. However, in certain lasers, notably semiconductor diode lasers, the laser wavelength is subject to undesirable variation. In the case of semiconductor diode lasers, it is believed that the wavelength changes result from temperature and current changes, and laser aging. The changes can occur continuously or in discrete jumps called "mode hops." This laser wavelength variation limits the precision attainable using laser optical measuring devices. Consequently, efforts have been made to stabilize the laser wavelength.

In the past, such efforts have been directed to stabilization of the temperature and current of the semiconductor diode laser, since it is known that temperature and current changes can cause variation in the laser wavelength. However, when implemented with the required level of accuracy, this procedure is expensive, and its complexity reduces overall system reliability. In addition, some wavelength variation is due to laser aging effects, and stabilization of temperature and current does nothing to overcome this aspect of the problem.

Accordingly, a need exists for more accurate laser optical measuring instruments that can produce accurate measurements in spite of laser wavelength variations. Similarly, a need exists for methods of enhancing the accuracy of measurements taken with laser optical measuring instruments, given the variable nature of laser beam wavelength.

BRIEF DESCRIPTION OF THE INVENTION

We have discovered a method of enhancing the accuracy of measurements taken with a laser optical measuring instrument where the instrument depends on a fringe pattern spacing that can vary with laser beam wavelength and direction. The method comprises intentionally altering the laser beam direction to compensate for wavelength changes, and thereby provide a constant fringe pattern spacing.

We have also invented a laser optical measuring instrument comprising:

(a) a laser beam source that generates a first laser beam;

(b) a laser beam splitting device that splits the first laser beam into a second and third beam, the second and third beams forming an included angle;

(c) means for deflecting the second and third beams so that they intersect to form a closing angle and so that variations in the fringe spacing caused by variations in the wavelength of the second and third beams are compensated by variations in the closing angle.

DETAILED DESCRIPTION OF THE INVENTION

Figure 1:
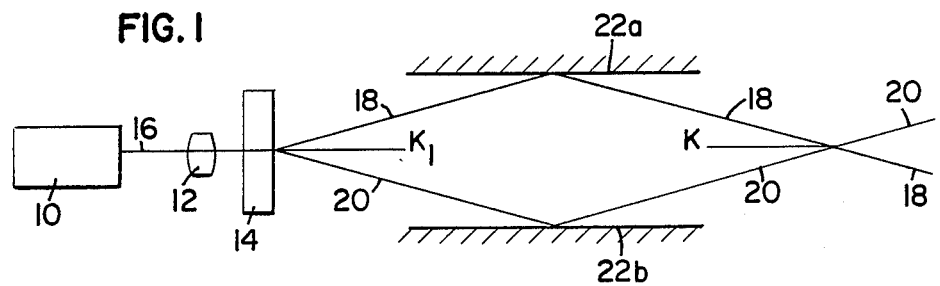
FIG. 1 is a schematic view of an aspect of the invention, using plane parallel mirrors to deflect the beams.

In accordance with the present invention, optical elements in the laser optical measuring device beam paths and the layout of the beam paths provide a substantially constant calibration factor or fringe pattern spacing, reducing the dependence of fringe pattern spacing on wavelength, over a useful range of operating wavelengths. Using our invention, the effects on the calibration factor due to wavelength changes in the laser can be made negligibly small, rendering possible the construction of ultra-stable laser optical measuring instruments of previously unattainable precision. Our invention results in improvements over current practices by a factor of between 2 and 3000 or more, for wavelength deviations from the desired wavelength of about 10 to 0.1 nanometers.

The laser optical measuring instruments of the invention include laser Doppler velocimeter (LDV) optical systems. LDVs form the largest class of noninvasive instruments currently used for the measurement of velocity. LDVs can be used for measuring flow velocities in combustion mixing, flames, rotating machinery, narrow channels, chemically reacting flows, wave tanks, wind or water tunnels, and other applications where conventional techniques perform poorly. LDVs are also used to measure the velocity of solid objects such as sheet aluminum stock in rolling mills and hot steel in blooming mills. Other instruments where measurements are based on the fringe spacing are known and include a particle sizing instrument.

Using an LDV, a measurement is made when a moving object scatters light while going through the beam crossing or intersection. This intersection is referred to as the sensitive volume or measuring volume.

The scattered light can be collected by a stationary detector. The frequency of the scattered light is shifted by the Doppler effect. This shift in frequency is proportional to the velocity of the object which scatters the light.

In a laser optical measuring instrument, light originates at the laser and passes into a beam splitting device from which two beams of light emerge. In our invention, any of the commonly available laser light sources can be used, such as the helium neon and argon ion lasers and semiconductor diode lasers. The laser source we prefer for use in our invention is the semiconductor diode laser, which is advantageous because it is physically compact, rugged, and extremely reliable.

Lenses, or, less commonly, other optical elements such as prisms can be used to collimate, spread, or focus the laser beam as necessary, and can be used in the manner and for the purposes well known by those in the art.

The instruments of our invention include a beam splitting device or beam splitter. The beam splitter can be any appropriate device useful for this purpose. Known useful beam splitters include gratings, prisms, partially-transmitting mirrors, acousto-optic devices, and fiber-optic directional couplers. Acousto-optic devices are well known. They involve the interaction of sound waves and light in a transparent medium, and have proven an effective means of amplitude-modulating, deflecting or shifting the optical frequency of laser light. A commonly used acousto-optic beam splitter is the Bragg cell.

We currently prefer the use of the Acousto-Optical Modulator System Model #N23040 available from Newport Electro Optics Systems, Inc., Melbourne, Fla. This modulator is a slow-shear mode $TeO_2$ type unit, having 90% transmission, 40 MHz frequency, about 5×15 mm clear aperture, and requires an RF power of less than 2 watts for an efficiency of 50%.

The laser beam generated by the laser beam source passes through the laser beam splitting device, which splits the beam so that it emerges as a second beam and a third beam. The angle between the second and third beams is used in certain arithmetic calculations and is referred to as the included angle. Some beam splitters split the laser beam into two parallel beams. Where the second and third beams are parallel, the included angle is zero. Fiber-optic directional couplers used as beam splitters split the light propagating in a single optical fiber into portions which propagate in two optical fibers. The light may be introduced into the single "input" fiber by means of a lens. The light emerging from each "output" fiber may be formed into a beam by collimating or focusing lenses. In an arrangement of this type, the included angle is fixed by positioning these fibers and lenses.

The light beams from the splitting device pass through other optical elements, which direct them to a common intersection region. In a velocimeter, the intersection region is in the path of the fluid whose flow is being measured. At the beam intersection, interference fringes are formed, as is well known and understood by those skilled in the art. Briefly, the interference fringes consist of intensity maxima and minima formed in the region where the beams intersect. The fringes (the minima and maxima) can be moving or stationary. For purposes of this application, the term "fringe pattern" will be used to refer to moving or stationary interference fringes.

Objects or particles passing through the fringe pattern scatter light from the intersecting laser beams. The intensity of the scattered light is converted to an electrical signal by means of a photodetector such as a photomultiplier or solid state photodetector. Because of the motion through the fringe pattern, this electrical signal is modulated by a frequency equal to the velocity of the object or particle, relative to the velocity of the fringes divided by the fringe pattern spacing. Consequently, measurement of this frequency and knowledge of the fringe pattern spacing and fringe velocity allows one to determine the velocity of the object or particle undergoing the LDV test.

The spacing of the fringe pattern refers to the distance between the intensity maxima of the interference fringes, and appears in arithmetic calculations used to arrive at the measurement provided by a laser optical measuring device. The fringe pattern spacing is given by the calibration factor $d_f$. This calibration factor depends on the wavelength of the split beams and the closing angle or intersection angle of these two beams. The formula for the calibration factor is:

$$d_f = WL/2\sin(K)$$

where WL is the wavelength of the intersecting beams or second and third beams, and K is half the closing angle of these two beams.

As previously noted, semiconductor diode lasers generate a laser wavelength which is subject to undesirable changes. As the laser wavelength changes, the fringe pattern spacing or calibration factor $d_f$ varies, in accordance with the above formula. In addition, the total dispersive effects of the optical elements in the beam paths, such as prisms, lenses, gratings, and the like, will cause the intersection angle or closing angle to change. This, too, affects the value of the calibration factor since K in the above formula for fringe pattern spacing is half the closing angle. Consequently, under current practices there are limits on the stability of the calibration factor, and on the overall precision attainable in LDV measurements.

The second and third beams are made to intersect using deflecting means that change the beams' directions. The deflecting means will be optical elements. As is known, deflection can be accomplished through the use of plane mirrors, prisms, gratings, or lenses. The optical elements can have a negative or positive dispersion, or no dispersion, as in the case of an achromatic prism or lens.

In accordance with the invention, the optical elements are selected or designed and placed so that wavelength changes induce compensating laser beam directional changes that reduce the fringe pattern spacing to a more nearly constant value. Variations in the fringe pattern spacing that would normally be caused by wavelength variation will be offset by variation in the closing angle caused by compensating changes in the beam directions. The compensating changes are provided by use of the correct optical elements.

Precise embodiments depend upon the particular laser optical measuring instrumentation or system utilized. FIG. 1 illustrates one system. In FIG. 1 is shown a laser source 10, an optical element or lens 12 to collimate the laser beam, and a beam splitter 14, which in this case is a grating or an acousto-optic device. The first laser beam 16 emerges from the laser beam source 10 and passes into the beam splitter 14, from where it emerges as second beam 18 and third beam 20. $K_1$ represents one half the angle between the two beams where they are formed, or the included angle. K represents one half the closing angle.

As is known, the wavelength dependence of angle $K_1$ is given by the formula:

$$K_1 = \sin^{-1}(WL/2A)$$

where A is the spacing of the grating lines. Where the splitter is an acousto-optic device, A is the wavelength of the acoustic wave.

Referring again to FIG. 1, 22a is a first plane parallel mirror to deflect second beam 18, and 22b is a second plane parallel mirror to deflect third beam 20. The mirrors are placed in the beam paths parallel to each other and perpendicular to the plane containing the second and third beams, so that $K_1 = K$ for any beam wavelength. By substituting $\sin^{-1}(WL/2A)$ for K in the formula for calibration factor or fringe pattern spacing, it is found that $d_f$ has become independent of laser beam wavelength.

Figure 2:
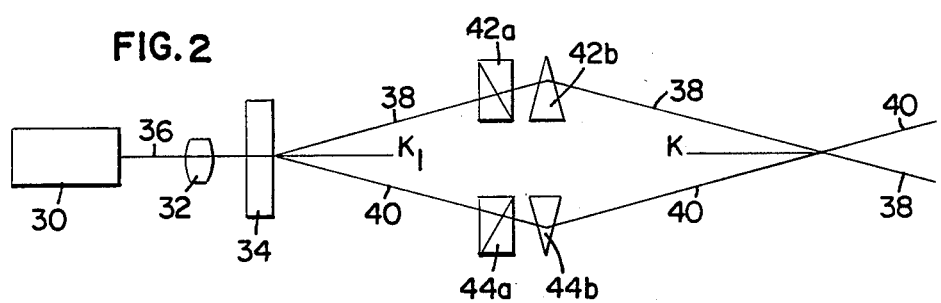
FIG. 2 is a schematic view of an aspect of the invention, using prisms to deflect the beams.

FIG. 2 illustrates another arrangement of optical elements to overcome fringe pattern spacing variation due to changes in wavelength. In FIG. 2, a laser beam source 30 generates a first beam 36 that is collimated by lens 32 and split by beam splitter 34. A first prism 42a deflects second beam 38 and a second prism 44a deflects third beam 40. An additional pair of prisms, 42b and 44b, further deflect beams 38 and 40. The dispersion of the prisms is selected so that $d_f$ is constant with respect to wavelength at the central operating wavelength. Use of two prisms per beam is for illustration purposes, and one designing the system could use one or more prisms per path. Systems of this kind tend to require the use of a large number of prisms, due to limitations in the diffraction and dispersion characteristics of currently available materials.

Figure 3:
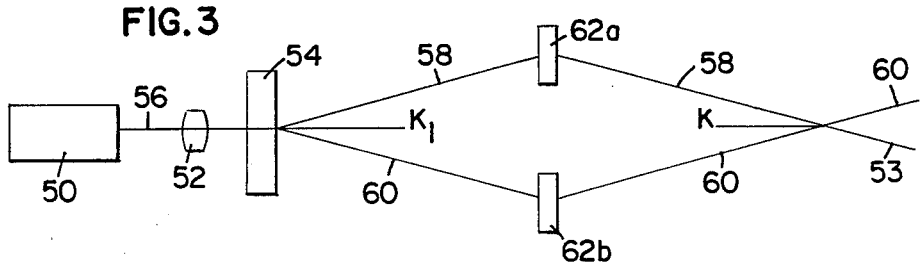
FIG. 3 is a schematic view of an aspect of the invention, using gratings to deflect the beams.

FIG. 3 illustrates the use of gratings in the invention for the proper deflection of the beams en route to their intersection. Laser light source 50 generates a first beam 56 which passes through lens 52 and beam splitter 54. Second and third beams 58 and 60 emerge from splitter 54. The beams are deflected through gratings 62a and 62b. The gratings are designed and placed according to well-known optical principles so that $K_1$ equals K.

Figure 4:
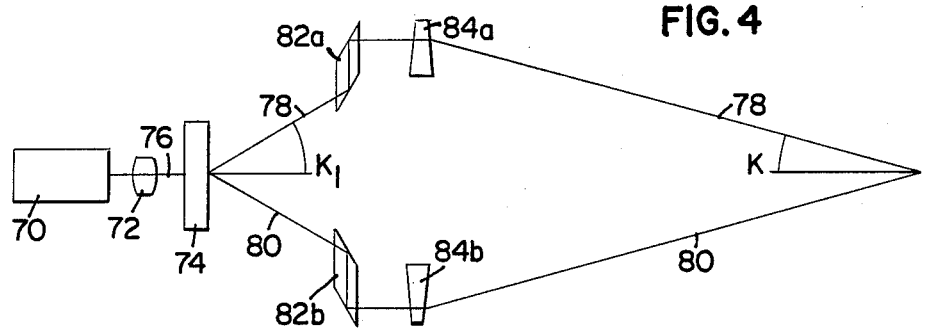
FIG. 4 is a schematic view showing traditional use of prisms to deflect the beams.

In many or most situations, $K_1$ will not be equal to the desired value of K. A typical situation where $K_1$ does not equal K is shown in FIG. 4. FIG. 4 does not incorporate the invention.

In FIG. 4, laser source 70 generates first beam 76 that can pass through a lens 72 and into a beam splitter 74, from which second beam 78 and third beam 80 emerge. $K_1$ is one half the included angle. Beam 78 is deflected by prisms 82a and 84a, while beam 80 is deflected by prisms 82b and 84b. The prisms are selected and placed to provide a particular closing angle. That angle is dictated by such factors as space considerations, desired frequency, the velocity to be measured, and the light scattering surface features of the object whose velocity is measured. One half the closing angle is represented as K.

In situations such as FIG. 4, some of the above described inventive arrangements of optical elements can be used or modified. We have achieved excellent results by providing optical elements that create angular changes of the same sign in K as occur in $K_1$. This relationship between the closing angle and included angle can be achieved by causing the second and third beams to cross before intersecting where the measurement is to be taken.

In the past, deflection of the second and third beams was such that decreases in the included angle due to wavelength variation produced corresponding increases in the closing angle, and increases in the included angle produced decreases in the closing angle. Such changes adversely affect the fringe pattern spacing or calibration factor $d_f$. We have discovered that if the beams are made to cross, using a minimum of two reflections in each beam, an increase or decrease in included angle can result in the same sign of change in the closing angle. This dramatically improves the stability of the fringe pattern spacing. Any remaining compensation needed to achieve more accurate control of the change in angle can be provided by the use of additional prisms or other optical elements.

Figure 5:
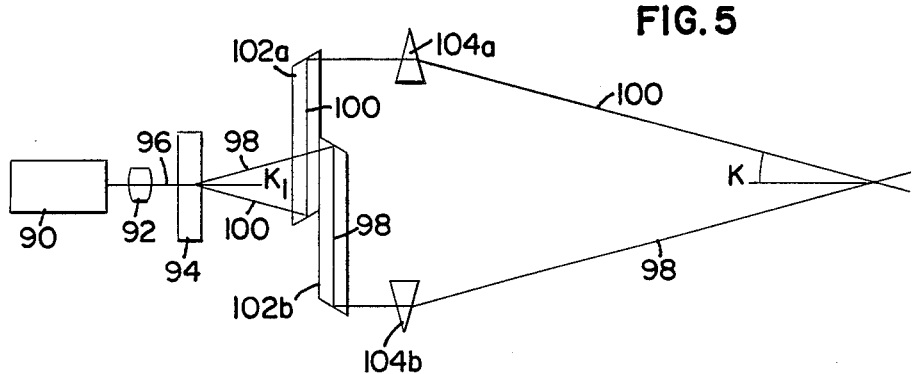
FIG. 5 is a schematic view of an aspect of the invention, showing cross over of the beams.

FIG. 5 illustrates the use of crossing beams. In FIG. 5, laser source 90 generates first beam 96 that passes through lens 92 into beam splitter 94. Second beam 98 and third beam 100 emerge from the beam splitter. Half the included angle is represented by $K_1$. Prisms 102a and 102b are selected and placed to cause beams 98 and 100 to cross over one another one time. Prisms 104a and 104b are placed in the beam paths to further deflect the beams to achieve the desired closing angle, one half of which is represented by K.

We have found that to achieve the same sign (positive or negative) for the wavelength change (or included angle) as for the change in closing angle, the following principle or rule of thumb applies: if the beams do not cross prior to their intersection at the measuring volume, then the number of reflections for each beam must be odd (see, e.g., FIG. 1). Where the beams do cross, the number of reflections must be even. If the compensation required is relatively small because $K_1$ is nearly equal to K, then one can violate this rule and still achieve adequate compensation. However, as a practical matter, one would have great difficulty designing a system without reliance on this rule because K rarely is close enough to $K_1$.

The design and placement of prisms, mirrors, gratings, or lenses to change the direction of light beams such as, in this case, the second and third beams to suit particular situations is described in Chapters 2 and 7 of the *Handbook of Optics*, Optical Society of America, McGraw Hill, 1978, hereby incorporated by reference.

In one system incorporating the invention, an arrangement of two doublet wedge prisms, having designed dispersion, is used in each of the two beams. This arrangement allows the beam crossing point to be moved over a range of operating distances. Use of a pair of prisms which can be rotated in opposition keeps the beams in their original plane. The doublet prisms are designed using Schott glass SF57 for the first element and Schott glass FK5 for the second element so as to provide the required degree of compensation for wavelength changes as described above. The refractive indices for these types of glass are as follows:

| Wavelength (nm) | Refractive Index | |
|---|---|---|
| | SF 57 | FK5 |
| 1014.0 | 1.81337 | 1.47913 |
| 852.1 | 1.82045 | 1.48137 |
| 706.5 | 1.83104 | 1.48410 |
| 656.3 | 1.83651 | 1.48535 |

As the closing angle is changed by rotating the prisms, the degree of dispersion of the combined prisms changes proportionately to the deviation angle of the combined prisms. This allows the compensation to be maintained adequately over a useful range of operating distances, or equivalently, closing angles.

Figure 7:
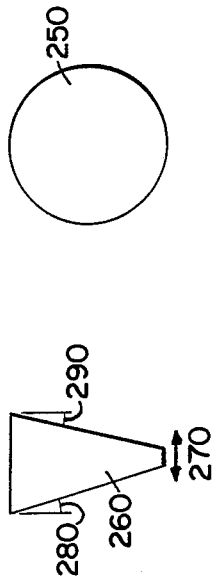
FIG. 7 illustrates the second element of a doublet wedge prism useful in the context of the invention.
Figure 6:
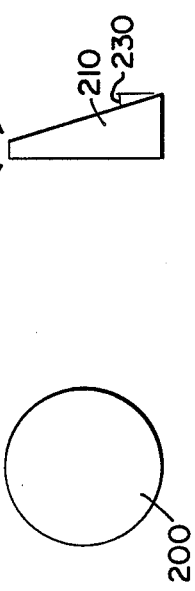
FIG. 6 illustrates the first element of a doublet wedge prism useful in the context of the invention.
Figure 8:
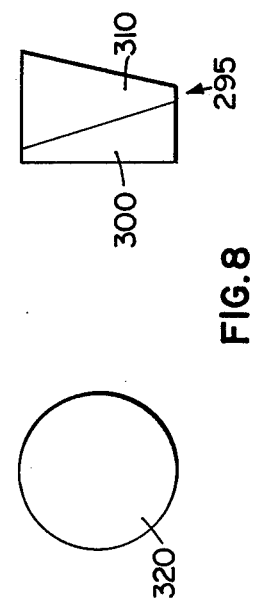
FIG. 8 illustrates the doublet wedge prism formed of the first and second elements.

A useful doublet wedge prism is illustrated in FIGS. 6–8. FIG. 6 illustrates the first element of the doublet wedge prism. The front of the first element is represented by 200, and has a diameter of 20 mm (±0.25 mm). A side view is represented by 210, with distance 220 of 3 mm (+0.5,−0.0 mm), and angle 230 of 17.00° (±0.01).

Turning now to FIG. 7, the second element of the doublet wedge prism is illustrated. The front is represented by 250, with a diameter of 20 mm (±0.25 mm). A side view is represented by 260, with distance 270 of 3 mm (+0.5,−0.0), angle 280 of 17.00 (±0.01), and angle 290 of 13.32° (±0.01).

FIG. 8 illustrates a front and side view of the doublet prism 295 composed of elements 1 (300) and 2 (310). The elements are held together using a UV cure adhesive, Norland 81. The doublet wedge prism includes an antireflection coating suitable for the wavelength in use. The angle of incidence at 830 nm is 0°. The diameter of the prism, 320, is 20 mm (±0.25 mm)

Using a laser diode having a wavelength of 830 nanometers, FIG. 4, that is, a system without the use of the present invention, results in a relative change in fringe spacing equal to 2.8 times the relative change in laser wavelength. By using the above two doublet wedge prisms, in accordance with the invention and FIG. 5, relative changes in the fringe spacing are maintained at less than 0.19 times the relative wavelength change over a range of +/−10 nanometers. This coefficient is furthermore quadratic in the wavelength departure from 830 nanometers. Thus, for example, if the central laser wavelength is 825 nanometers, then the relative fringe spacing change is 0.048 times the relative change in laser wavelength; if the central wavelength is 831 nanometers, the corresponding coefficient is 0.019. These figures illustrate the exceptional results that can be achieved by use of the invention.

In practice, the laser optical measuring instruments of our invention can consist of an optics head and a separate monitor/signal processor. The optics head can house the laser source, transmitting optics, receiving optics, photodiode, and related electronics. The photodiode can detect the Doppler frequency, which is then processed to provide the desired measurement. The monitor/signal processor unit can incorporate signal processing, monitor, and communication interface electronics.

The detected Doppler signal can be conditioned in the optics head and forwarded to the monitor/signal processor via an interconnecting cable. A microprocessor can translate the frequency data into the desired measurement information.

The optics head can be mounted within the mill or production environment at the measuring location, and can be protected by an environmental housing. The environmental housing can incorporate water cooling and air wipe facilities to protect the optics head from high temperature, humidity, and dust. The air wipe can direct compressed air across the optics window to keep it clean during operation. A pneumatic shutter can be provided to cover and protect the window when the unit is not in use or when no measurements are being taken. Control of the shutter can be incorporated into the process controller.

The electronics unit can be located in the facility computer room or in a similar environment. We recommend the incorporation of a parallel output bus to send measurement information to an external computer or process controller.

Numerous modifications and variations of the present invention are possible in light of the above teachings. It is, therefore, to be understood that within the scope of the appended claims, the invention may be practiced otherwise than as specifically described herein.

We claim:

1. A method of stabilizing fringe pattern spacing in a laser optical measuring instrument, wherein the fringe pattern spacing is formed by intersecting laser beams, the beams each having a wavelength and a direction, and wherein the fringe pattern spacing varies with the wavelengths and directions of the beams, comprising the step of: altering the direction of at least one of the beams automatically in response to changes in the wavelength of that beam through use of a dispersive element, whereby variations in the fringe pattern spacing due to the wavelength change are eliminated without movement of said dispersive element to provide a stabilized fringe pattern spacing.

2. The method of claim 1 wherein the method of altering the laser beam direction comprises the steps of:
   (a) splitting a generated laser beam into a second beam and a third beam; and
   (b) deflecting the second and third beams to intersect at a closing angle using optical elements in a fixed spatial relation and orientation, whereby the fringe pattern spacing is represented by the formula: $d_f = WL/2\sin(K)$, where $d_f$ is the fringe pattern spacing, WL is the wavelength of the first laser beam, and K is one-half the closing angle.

3. The method of claim 2 wherein the laser optical measuring instrument includes a first wedge prism and a second wedge prism, and the distance between the first and second wedge prism and the intersection defines a standoff distance and wherein the deflecting step further comprises varying the first and second wedge prisms by rotating the wedge prisms in relation to one another in response to changes in the standoff distance, whereby compensation for changes in the standoff distance may be made while preserving the stabilized fringe pattern spacing without requiring additional movement.

4. The method of claim 2 wherein a sensing volume is defined by the intersection of the second and third beams and further comprising the step of detecting a Doppler frequency generated by an object moving through the sensing volume.

5. The method of claim 4 wherein the number of deflections for each of the second and third beams are odd when the second and third beams do not intersect prior to the sensing volume.

6. The method of claim 4 wherein the number of deflections for each of the second and third beams are even when the second and third beams intersect prior to the sensing volume.

7. A laser optical measuring instrument comprising:
   (a) a laser beam source that generates a first laser beam;
   (b) a laser beam splitting device that accepts the first laser beam and splits it so that the first laser beam emerges from the laser beam splitting device as a second beam and a third beam, the second and third beams forming an included angle; and (c) means for deflecting at least one of the second and third beams to form a closing angle and a fringe pattern spacing, the deflecting means including dispersive elements which are responsive to variations in the wavelength of the first beam, and wherein the deflecting means stabilize the fringe pattern spacing by varying the closing angle, the deflecting means being fixed in spacial relation and orientation while operative.

8. The instrument of claim 7 wherein the laser beam splitting device includes a grating.

9. The instrument of claim 8 wherein the grating includes grating lines, and wherein the included angle is represented by the formula: $K_1 = \sin^{-1}(WL/2A)$, wherein $K_1$ is one-half the value of the included angle, WL is the wavelength of the first laser beam, and A is the spacing of (distance between) the grating lines.

10. The instrument of claim 7 wherein the laser beam splitting device includes an acousto-optic device that creates an acoustic wave, and wherein the included angle is represented by the formula: $K_1 = \sin^{-1}(WL/2A)$, wherein $K_1$ is one-half the value of the included angle, WL is the wavelength of the first laser beam, and A is wavelength of the acoustic wave.

11. The instrument of claim 7 wherein the deflecting means includes a pair of plane parallel mirrors, including a first mirror to deflect the second beam and a second mirror to deflect the third beam.

12. The instrument of claim 7 wherein the deflecting means includes a pair of prisms, including a first prism to deflect the second beam and a second prism to deflect the third beam.

13. The instrument of claim 12 wherein the prisms have a positive dispersion.

14. The instrument of claim 12 wherein the prisms have a negative dispersion.

15. The instrument of claim 12 wherein the prisms are acromatic prisms.

16. The instrument of claim 7 wherein the deflecting means includes a pair of doublet wedge prisms.

17. The instrument of claim 7 wherein the deflecting means comprises a grating.

18. The instrument of claim 7 wherein the measurement of the included angle equals the measurement of the closing angle.

19. The apparatus of claim 7 wherein the laser optical measuring instrument is a laser Doppler velocimeter.

20. The apparatus of claim 7 wherein the laser optical measuring instrument is a laser interferometer.

21. The apparatus of claim 7 wherein the laser optical measuring instrument is a laser particle sizing instrument.

22. A method of stabilizing fringe pattern spacing in a laser optical measuring instrument comprising the steps of:

(a) generating a first laser beam having a wavelength;

(b) splitting the first laser beam into a second beam and a third beam, wherein the second and third beam form an included angle; and (c) deflecting the second and third beams with dispersive elements, the beams being deflected so as to intersect at a sensing volume with a fringe pattern spacing, the intersection of the second and third beams forming a closing angle, the deflection of the second and third beam, and thereby the closing angle, automatically varying due to the dispersion of the elements as a function of the wavelength, whereby the fringe pattern spacing is held more nearly constant without adjustment of said dispersive elements.

23. The method of stabilizing fringe pattern spacing as recited in claim 22, wherein said deflecting step utilizes dispersive elements arranged and configured in a fixed spatial relationship, whereby measurement of the change in wavelength is not required.

24. The method of stabilizing fringe pattern spacing as recited in claim 22, wherein said deflecting step utilizes dispersive elements arranged and configured in a fixed spatial relationship, whereby a change in Bragg cell frequency is not required.

25. The method of stabilizing fringe pattern spacing as recited in claim 23, wherein said deflecting step utilizes dispersive elements arranged and configured in a fixed spatial relationship, whereby a wavelength measurement or a change in Bragg cell frequency is not required.

* * * * *